United States Patent [19]

Kawasaki et al.

[11] Patent Number: 4,630,042

[45] Date of Patent: Dec. 16, 1986

[54] WIRED COMMODITY VENDING SYSTEM

[75] Inventors: Kikuo Kawasaki; Tomomi Sano; Hitoshi Yamamoto, all of Kawasaki, Japan

[73] Assignee: Fuji Electric Co., Ltd., Kanagawa, Japan

[21] Appl. No.: 737,071

[22] Filed: May 23, 1985

Related U.S. Application Data

[63] Continuation-in-part of Ser. No. 439,186, Nov. 4, 1982, abandoned, which is a continuation-in-part of Ser. No. 261,194, filed as PCT JP80/00201, Aug. 29, 1980, published as WO81/00635, Mar. 5, 1981, § 102(e) date Apr. 22, 1981, abandoned.

[30] Foreign Application Priority Data

Aug. 29, 1979 [JP] Japan ................................ 54-109020

[51] Int. Cl.[4] .......................... H04Q 9/00; H04J 3/02; G07F 11/00

[52] U.S. Cl. .......................... 340/825.35; 340/825.07; 221/4

[58] Field of Search .......... 340/825.35, 286 R, 825.54, 340/, 825.07, 825.52; 235/385, 381; 364/479, 200; 194/1 N; 221/9, 4

[56] References Cited

U.S. PATENT DOCUMENTS

| | | | |
|---|---|---|---|
| 3,426,326 | 2/1969 | Goldstein | 340/825.35 |
| 4,237,536 | 12/1980 | Enelow et al. | 364/479 |
| 4,264,954 | 4/1981 | Briggs et al. | 364/200 |
| 4,287,508 | 9/1981 | Arita et al. | 340/825.07 |
| 4,306,219 | 12/1981 | Main et al. | 340/870.07 |
| 4,366,481 | 12/1982 | Main et al. | 340/825.54 |
| 4,412,292 | 10/1983 | Sedam et al. | 364/479 |
| 4,423,506 | 12/1983 | Kawasaki et al. | 340/825.52 |

FOREIGN PATENT DOCUMENTS

| | | | |
|---|---|---|---|
| 1536534 | 12/1978 | United Kingdom | 340/286 |

*Primary Examiner*—Donald J. Yusko

*Attorney, Agent, or Firm*—Stevens, Davis, Miller & Mosher

[57] ABSTRACT

A wired commodity vending system which comprises a plurality of slave stations each having an automatic vending machine including an outer door and an inner door and a controller for preparing and storing commodity sales data, and a master station for managing the slave stations to which the slave stations are commonly connected through data transmission lines so that the items of commodity sales data in the respective vending machines are processed by the master station. The wired commodity vending system processes the commodity sales data by specifying the address of the slave station through the master station to provisionally transmit the commodity sales data stored in the slave station from the addressed slave station to the master station according to the address in response to the control data transmitted from the master station to the slave station, re-transmitting the control data from the master station following reception of the commodity sales data, re-transmitting the commodity sales data together with operating status data prepared by the controller to the master station in response to the control data from the addressed slave station which received the control data, and collating and confirming the commodity sales data and control and status data repetitively received at the master station. The first transmitted commodity sales data is one of the number of sold commodities, by type of commodity, and the number of commodities, by type, presently retained in the vending machine, while the second transmitted commodity sales data is both the number of sold commodities, by type, and the number of the commodities, by type, retained at present in the vending machine.

15 Claims, 15 Drawing Figures

CPU
clock generator
vending machine
clock generating ck
KSW
MD
BT2
CG
Tr21
Tr22
Tr23
Tr24
RL1
D31
D32
C8
OP2
PC1
PC2
INV4
INV5
INV1
INV2
INV3
ACP
ZD
TR
DB1
DB2
C4
D11
FT
C1
C2
C3
C5
C6
C7
R1
R2
R3
D12
D13
D14
D16
BT1
Tr1
Tr2
Tr3
DS
D15
11
12
13
14
15
15'
16
16'
17
18
19
20
21
22
23
24
25
26

WIRED COMMODITY VENDING SYSTEM

RELATION TO PRIOR APPLICATIONS

The present application is a continuation-in-part of U.S. Ser. No. 439,186 filed Nov. 4, 1982 which is a continuation-in-part of U.S. Ser. No. 261,194 filed Apr. 22, 1981, both abandoned which is based on international Application PCT/JP80/00201 filed Aug. 29, 1980.

TECHNICAL FIELD

The present invention relates to a wired commodity vending system in which a plurality of slave stations, each having an automatic vending machine including a controller for preparing and storing commodity sales data relating to various items of commodities, are commonly connected through data transmission lines to a master station for managing the slave stations, the commodity sales data for the automatic vending machines being processed by the master station. In the system of the invention the transmission reliability of the commodity sales data is improved and a degree of freedom in a recombination of the commodity sales data and an operation state data of the automatic vending machine is increased.

BACKGROUND ART

A wired commodity vending system of this type has been known and referred to as a so-called hotel vendor system. In a conventional hotel vendor system, the control units of the master and slave stations are both constructed by logic integrated circuits having a hard wired configuration. Accordingly, the control unit has poor flexibility and is usually monofunctional. Further, the master station provided, for example, at the front desk in the hotel is wired with the slave stations in the respective guest rooms. As a result, there is a high possibility that various types of noise current and voltage are induced into the data transmission line from the power distributing lines running in parallel therewith which disturbs the transmission of the commodity sales data.

Many types of transmission systems, which accurately transmit data by preventing the inclusion of noise voltage and current, have been developed and used. General modulation systems or multi-communication systems of this type have a disadvantage in that the configuration of the necessary circuit construction is complicated and expensive for simple data transmission requirements such as employed in a wired commodity vending system, for example, a hotel vendor system.

Also, in the hotel vendor system in which the transmitted data can be sent in various ways and the cost allowed for the data transmission system is limited, it has been desired to add additional system functions with a minimum of functional construction. In the conventional hard wired system, it has been difficult to improve the freedom of adding functions while keeping the system construction inexpensive.

In the conventional hotel vendor system, each time that commodity sales data is collected by the master station, each slave station transmits its sales data only once. In this case, the data transmission rate is usually synchronized with the zero-crossing point of a commercial power source AC voltage and is limited to 100 or 120 pulses per second. By taking advantage of the power source synchronizing system, the reliability of the data transmission is improved and liquidation (processing operations based on the collected commodity sales data) occurs on the basis of single commodity sales data transmission. In a three-phase power source synchronizing system where a data pulse is transmitted at every zero cross point of the AC voltage, poor synchronization occurs due to the phase differences of each phase voltage, or a power interruption makes it impossible to transmit data. Accordingly, a three-phase AC power synchronizing system has various drawbacks.

DISCLOSURE OF INVENTION

An object of the present invention is to provide a wired commodity vending system in which the above-described disadvantages associated with prior commodity vending systems are eliminated, the commodity sales data is transmitted at high speed with improved reliability, and the degree of freedom in adding other functions to the system is increased.

In order to achieve this object, according to the present invention, a wired commodity vending system is provided in which a plurality of slave stations, each having a vending machine including an outer door which can be opened so that a desired number of commodities can be taken out, an inner door which is opened for supplementing commodities which can be taken out, a commodity rack for accommodating a plurality of different kinds of commodities and having a matrix of sensors for sensing the presence or absence of commodities accommodated in the rack and control contacts for controlling the vending machine, and a controller for forming and storing commodity sales data, are connected in common to a master station which manages the slave stations through data transmission lines, and respective commodity sales data for the vending machines are processed by the master station, the system being characterized in that:

the controller operates after the outer door is closed to form and store the commodity sales data, in response to command data including control instruction data transmitted from the master station to a slave station, the address of which is designated by the master station, the commodity sales data stored in the addressed slave station and the control instruction data transmitted from the master station are provisionally transmitted to the master station, the command data is transmitted again from the master station subsequent to the reception of the commodity sales data and the control instruction data, commodity sales data and operating status data formed by the controller after the vending machine is operated in accordance with the control instruction data are transmitted again to the master station from the addressed slave station which has received the control instruction data, and in that, in the master station, the commodity sales data is processed after the master station confirms collations between the repeatedly received control instruction data and the operating status data, and between the provisionally transmitted sales commodity data and the again transmitted sales commodity data.

In the present invention, it is preferable that a plurality of commodity items are accommodated in a vending machine in a manner that a commodity is taken out by opening an outer door and the commodities are supplied by opening an inner door and that the vending machine comprises sales information detecting means for detecting the numbers sold or remaining of commodities corresponding to the plurality of items, storage means to be triggered after the closure of the outer door for storing, with every item, commodity sales information calculated in accordance with the number of the commodities sold or remaining by the controller, and the commodity sales data is composed of a reference number data representing a predetermined accommodation number of commodities in the vending machine and at least one of data of the number of sold commodities representing the number of commodities sold in accordance with the opening and closing of the outer door or data of the number of commodities retained at present in the vending machine after the opening and closing of the outer door.

BRIEF DESCRIPTION OF DRAWINGS

FIG. 12 is a block diagram showing an embodiment of the master and slave stations shown in FIG. 1; and FIGS. 13 and 14 are flowcharts showing controlling operations of the master and slave stations, respectively.

BEST MODE FOR CARRYING OUT THE INVENTION

The present invention will be described on the basis of embodiments with reference to the accompanying drawings.

Figure 1:
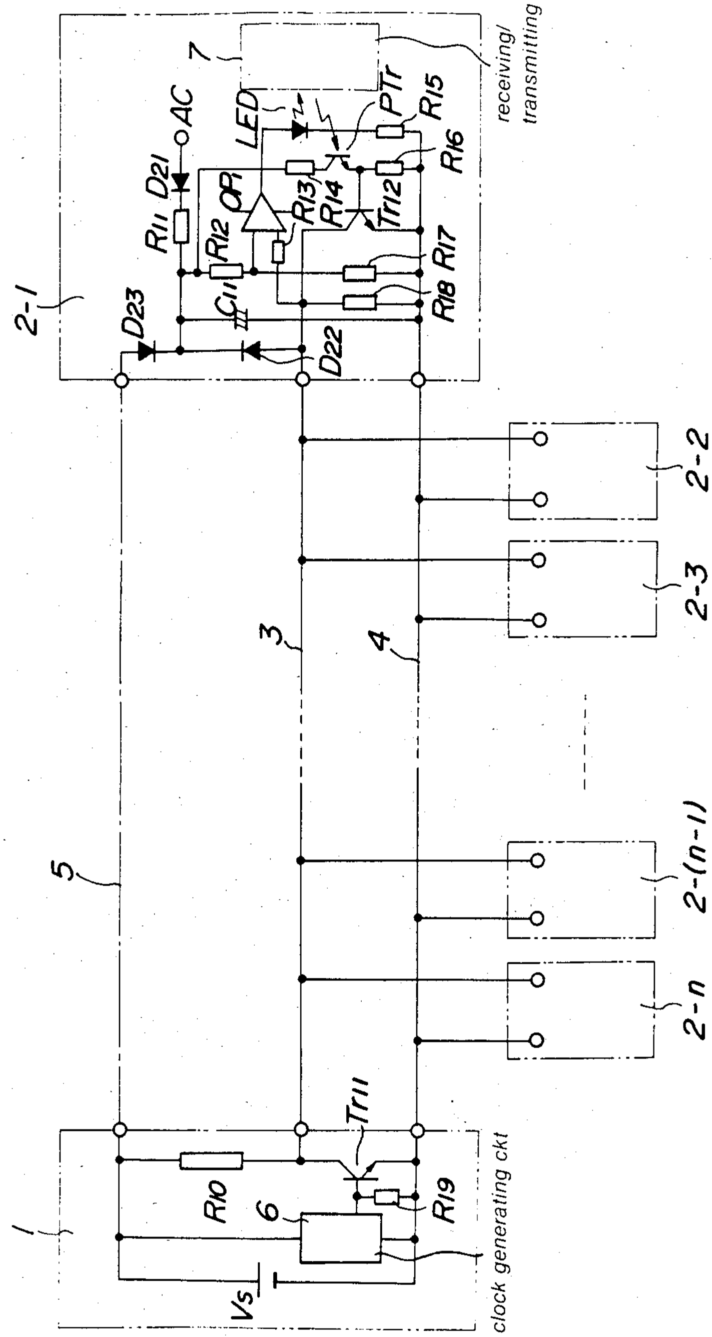
FIG. 1 is a circuit diagram showing an embodiment of a circuit construction of a data transmission system according to the present invention.

FIG. 1 shows an embodiment of a construction of a data transmission system according to the present invention, wherein a plurality of slave stations are commonly connected to a master station, through a pair of transmission lines. A power source provided in the master station applies a DC voltage between the transmission lines via a resistor. The switching element connected between the transmission lines at each station short-circuits the two transmission lines in accordance with a data to transmit coded data. Reference numeral 1 designates a master station for controlling the overall data transmission system. Numerals 2-1, 2-2, . . . , 2-*n* designate slave stations as terminals to be controlled. Numerals 3 and 4 designate a pair of signal lines which connect the master station commonly to n slave stations 2-1 to 2-*n*. Numeral 5 represents a power auxiliary line.

The master station 1 has a clock generating circuit 6 of which an output clock pulse is amplified by an output amplifier comprised of an output transistor Tr11, resistors R10 and R19, and then is transmitted to the signal lines 3 and 4. Vs is a power source for the master station. The slave stations 2-1 to 2-*n* have a similar construction, the slave station 2-1, for example, is comprised of a receiving transmitting circuit 7, a light emitting element, for example, a light emitting diode LED and light receiving element, for example, photo transistor PTr, both of which cooperate to transfer the signal between the signal lines 3 and 4, a transistor Tr12 for amplifying the output from the photo transistor PTr, and an operational amplifier OP1 for detecting incoming signals from the signal lines 3 and 4. In the slave station 2-1, R11–R18 are resistors, C11 is a capacitor, D21–D23 are diodes, and AC is an AC power source terminal.

Further, the number n of the slave stations 2-1 to 2-*n* can be increased until the reception and transmission of the signals fails due to the resistances of the signal lines 3 and 4. Usually, n=100 stations can readily be realized. When the number of slave stations increases, the signal current flowing into the terminal resistor R18 of the slave station 2, for example, increases the reduction of a signal level produced by the resistance of the signal line. The master station fails to detect the ON condition of the transistor Tr12 for the signal transmission in the slave station which is remote from the master station. As a result, it is difficult to transmit data from the slave stations, as will be described later. The above-mentioned drop of signal line voltage in the slave station causes a reduction of a charging voltage across the capacitor C11 which is charged by the signal line voltage through the diode D12 connected to the signal line, as will be described later. This drop of charging voltage across the capacitor C11 causes a problem in that it is difficult to detect data transmitted from the master station.

Figure 2:
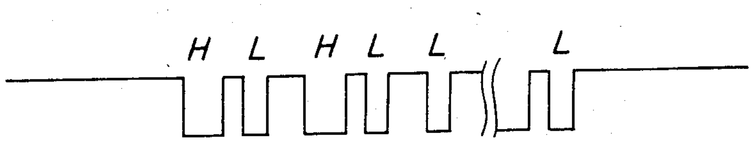
FIG. 2 is a waveform illustrating an example of a data transmission signal waveform from a master station of the data transmission system.

An example of a signal waveform of the data signal transmitted from the master station in this data transmission system, is shown in FIG. 2. In the construction shown in FIG. 1, DC voltage, for example, 24 V is always applied to the signal line 3 from the DC power source Vs through the resistor R10 in the master station 1. Under this condition, in order to transmit from the master station 1 the data signal having the waveform shown in FIG. 2, the pair of signal lines 3 and 4 is short-circuited by repeatedly turning on the output transistor Tr11 at a fixed interval by the control signal from the clock generating circuit 6. In the transmission system shown in FIG. 1, the signal to be transmitted is a binary signal represented by 1 or 0, or H or L, as shown in FIG. 2. Specifically, the binary signal is represented by assigning H to a long ON or conduction time of the output transistor Tr11, and also assigning L to a short conduction time of the output transistor Tr11. This data signal is simultaneously transmitted from the master station 1 to all of the slave stations 2-1 to 2-*n*. In the slave station which receives this signal, a terminal voltage across the terminal resistor R18 connected between the signal lines 3 and 4 is applied to the operational amplifier OP1 through a resistor R13. The data signal waveform shown in FIG. 2 is detected in the form of the difference between the terminal voltage and a constant voltage set by the resistors R12 and R17. When the signal lines 3 and 4 are short-circuited, for example, the light emitting diode LED emits light. The flashing of the light emitting diode LED transmits the data signal to the receiving/transmitting circuit 7 in the form of a light signal. The receiving/transmitting circuit 7 is comprised of a microcomputer or the like. The receiving/-transmitting circuit 7 analyzes the data signal thus received and converted. The circuit 7 judges if the address for designating a specified slave station in the data signal is coincident with the address of the slave station in question or not. If those addresses are coincident, it detects the contents of the succeeding data, e.g., data transmission control data. The receiving/transmitting circuit 7 not only receives this data but also prepares for the transmission of the data to be sent in response to the data transmission control information from the master station 1. The types of data sent from the slave station will depend on the use to which the data transmission system is put. In the so-called hotel vendor system, the data represents data for the number of commodities sold by a vending refrigerator, data for the number of commodities retained in the refrigerator, information on various electrical contacts, operation information, or the like. In an automatic measurement system, the data represents measured amount data.

Figure 3:
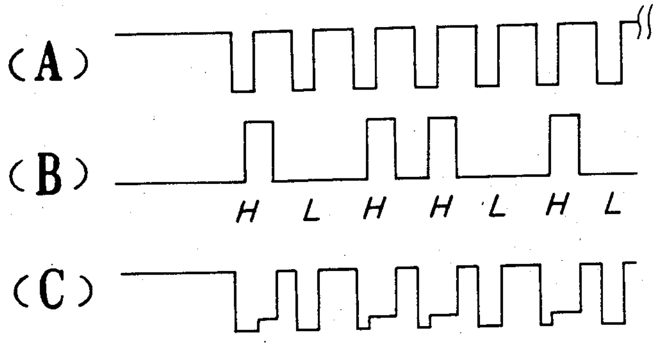
FIGS. 3A, 3B and 3C are a set of waveforms sequentially illustrating a process of the data transmission from a slave station.

The slave station, for example, the slave station 2-1, whose address is designated by the master station 1, forms the data signals to be sent to the master station such as shown in FIG. 3A–3C. The slave station 2-1 detects a train of clock pulses, shown in FIG. 3A, transmitted from the master station 1 at a fixed time interval, following the above-mentioned address signal. In synchronism with the clock pulse train, binary data signals representing H and L in accordance with the presence or absence of a pulse having a wider pulse width than the clock pulse, as shown in FIG. 3B, is formed. The binary signal for response is transmitted to the master station 1. This responsive binary data signal is supplied to the photo transistor PTr through the form of light signal to control the ON/OFF of the photo transistor PTr. When the responsive data signal waveform has a high level, the transmitting transistor Tr12 is turned on or made conductive to short-circuit signal lines 3 and 4. The time during which the transmission lines are short-circuited for transmitting the data from the slave station 2-1 is determined in such a manner that the short-circuiting condition is maintained for a fixed period of time after the clock pulse from the master station 1 is detected and is released before the next clock pulse arrives. When the signal lines are short-circuited in the slave station 2-1, the voltage between the signal lines which appears at the output terminal of the output transistor Tr11 in the master station 1 is not sufficiently restored, since the signal lines are short-circuited through the resistances thereof, in the case where the transmission transistor Tr12 in the slave station 2-1 is in an ON state even through the output transistor Tr11 is returned to an OFF state when the clock pulse is transmitted from the master station, as shown in FIG. 3C. At the instant when the transmission transistor Tr in the slave station 2-1 returns to an OFF state, the voltage between the signal lines is restored. When the responsive data signal waveform from the slave station 2-1 is the L signal shown in FIG. 3B, the transmission Tr12 is not turned on. As a result, the output transistor Tr11 in the master station 1 returns to an OFF state. At the same time, the voltage between the signal lines which appears at the output terminal of the output transistor Tr11 in the master station 1 returns to the original voltage between the lines. Therefore, the master station 1 can receive the responsive data signal from the slave station 2-1, by monitoring the relation between the voltage between the lines and the ON/OFF state of the output transistor Tr11.

The slave station which transmits the responsive data signal is only that slave station designated by the address signal from the master station 1. Whether or not the responsive data signal should be transmitted to the master station 1 in response to the reception of the address signal is monitored and controlled by the receiving/transmitting circuit 7 in the respective slave stations 2-1 to **2-*n*. In order to ensure and to facilitate the monitor and control by the receiving/transmitting circuit 7, there is provided a predetermined time interval between the address and control command signals from the master station 1 and the clock pulse train for the responsive transmission from the slave station, so that the data transmission is repeatedly performed with a unit period of data transmission composed of a period of signal train separated by the predetermined time interval, i.e., a period during which the transmission from the master station 1 and the reception following the transmission are carried out. For example, in the hotel vendor system, the commodity sales data in the vending machines equipped in respective guest rooms in the hotel are collected sequentially. Further, in the respective slave stations 2-1 to 2-*n*, even if the transmission signal from the master station 1** is received, the responsive data signal is not transmitted and the reception stand-by condition is maintained as long as the slave station does not receive the clock pulse train for transmitting the responsive data until a predetermined time lapses.

Next, an explanation will be made with respect to the supply of power for driving the circuit arrangements in the respective slave stations 2-1 to **2-*n* for performing the above-mentioned reception and transmission. The circuit arrangements in the respective slave stations are normally driven by a DC power source voltage obtained by rectifying a commercial AC power source from the AC terminal by the diode D21. Usually, the driving power is supplied from the rectified source to the receiving/transmitting circuit 7. If by chance the commercial AC power source of interrupted, a chargeable battery works as an auxiliary power source. On the other hand, a driving voltage is supplied to the signal circuit portion for receiving directly the transmission signal from the master station 1. The driving voltage is in the form of a combination of a DC voltage obtained by charging and smoothing the DC voltage supplied from the master station 1 to the signal line 3 in the capacitor C11 via the diode D22, and a DC voltage obtained by rectifying the commerical AC power source voltage by the diode D21 and then by charging the rectified voltage in the same capacitor C11. The reasons why the driving power sources for the receiving/transmitting circuit 7** and the remaining signal circuit portion are provided separately instead of from a common power source, and the signal transmission between them are electrically insulated by means of a light signal, are to provide an electrical separation between the circuits so as to improve reliability against noise of the receiving/transmitting circuit 7 for controlling the data reception and transmission in the slave station and the removal of any influence due to circuit grounding. In the receiving/transmitting circuit 7, a built-in battery can be used as the driving power source, so that the potential of the whole of the receiving/transmitting circuit 7 may be designed to float and the negative voltage terminal of the signal line may be connected to the receiving/transmitting circuit 7 as the grounding potential of the receiving/transmitting circuit 7. In this case, the grounding potential of the receiving/transmitting circuit 7 formed by a microcomputer or the like is varied in accordance with the variation of potential at the signal line. Accordingly, the surge durability of the receiving/transmitting circuit 7 is deteriorated and it follows that it is necessary to reinforce the electrical insulation of the receiving/transmitting circuit 7. That is to say, the signal lines 3 and 4 extend in the order of several kilometers, for example, so that the signal lines are easily subject to external influences such as from an induction from a commercial power transmission line or electric shock over the span of the signal lines and accordingly it is necessary to prevent spurious signals from appearing on the signal lines.

On the other hand, between the signal lines 3 and 4 extending between the master station 1 and the slave stations 2-1 to 2-*n*, the DC voltage, for example 24 V, is always supplied from the power source Vs via the resistor R10, except when the signal lines are short-circuited to transmit the data signal or clock pulse, so that the capacitor C11 in the slave station can be charged by the power source Vs in the master station sequentially via the series resistor R10 having a relatively low resistance, the resistance of the signal line and the diode D22 in the slave station. The capacitor C11 in the slave station is also charged by the rectified output of the commercial AC power source voltage in a normal condition, and hence it is not necessary to supply the DC voltage from the signal line. However, in order that the capacitor C11 in each of a few slave stations is chargeable by the power source Vs in the master station, the resistance of the series resistor R10 is selected at a relatively low value as mentioned above, so that the transmission and reception of the overall data transmission system can be maintained, even if power interruption occurs simultaneously at the slave stations, the number of which corresponds to a few per cent of the plurality of the slave stations. In order that the transmission and reception of the overall data transmission system is maintained, even if the number of the slave stations in which power interruption occurs simultaneously is increased, a power supply auxiliary line 5 may be separately provided, as shown in FIG. 1, in parallel with the signal lines so that the capacitor C11 is always charged from the power source Vs in the master station via the diode D23 in the respective slave stations. In this case, the commercial AC power source equipment in each of the slave station can be omitted. Further, if the auxiliary power supply line 5 is not provided, the DC voltage between the signal lines is merely instantaneously and locally short-circuited by the output transistor Tr11 on the side of the master station or the transmitting transistor Tr12 on the side of each of the slave stations, at the time of the transmission and reception of the data signal and therefore the capacitor C11 in each of a few slave stations is sufficiently charged.

Now, an outline of the advantages of a wired commodity vending system according to the present invention will be explained as follows:

(1) An improved data transmission rate and omission of a synchronizing circuit:

As will be described hereinafter, in the slave station 2-1 which has received the clock pulse train transmitted from the master station 1, the pulse width of the clock pulse train is modulated so that the data is transmitted to the master station from the slave station 2-*i*.

(2) An improved reliability of data transmission:

The transmitted data is confirmed by transmitting the same data repeatedly between the master station 1 and the slave station 2-*i*.

(3) An increase in the degree of freedom of data formation:

By transmitting a data indicative of the operation status of the slave station 2-*i* to the master station, the master station 1 judges and instructs a pertinent processing to occur in the slave station 2-*i* and also the commodity sales data is composed of the data representing the number of sold commodities by kind and data representing the number of the commodities retained in the vending machine. These numbers of the commodities are selectively collected at the time of check-in, check-out and sequential scanning of the respective slave stations.

In order to form a wired commodity vending system according to the present invention having the above-described essential features, the following items must be taken into consideration.

(1) The data transmission system operates normally even when the commercial power source of the slave station 2-*i* is interrupted.

(2) Each of the master station 1 and the slave stations 2-*i* has an electronic control circuit apparatus and is controlled thereby.

(3) When the commercial power source of the slave station 2-*i* is interrupted, the storage of data is maintained by a battery, or by storing the data in a nonvolatile memory device.

(4) The slave station 2-*i* can attain at least the minimum functions and also the maximum functions permitting addition of any desired functions.

First of all, with respect to an embodiment of a construction of a data transmission system in which the data transmission rate is improved and the synchronizing circuit is removed, as described in the above item (1) of the outline of a wired commodity vending system according to the invention, the master station 1 and a plurality of the slave stations 2-1, 2-2, . . . , 2-*n* are commonly connected by the pair of the signal lines 3 and 4, as shown in FIG. 1. When the data is transmitted from the master station 1, the DC voltage is applied between the signal lines 3 and 4 from the power source Vs via the registor R10 and the output transistor Tr11 connected between the transmission lines 3 and 4 is short-circuited in accordance with the data signal, so that the transmission lines 3 and 4 are short-circuited to form a DC voltage pulse.

That is, when the output transistor Tr11 is kept opened, a voltage is applied to the resistor R18 of the slave station 2-*i* via the resistor R10, so that the voltage across the resistor R18 rises to the "H" level. On the other hand, when the output transistor Tr11 is kept short-circuited, no voltage is applied to the resistor R18 of the slave station 2-*i*, so that the voltage across the resistor R18 is at the "L" level. As a result, when viewed from the slave station 2-*i*, a DC voltage pulse is produced across the resistor R18 by short-circuiting and opening the transistor Tr11 in the master station 1.

The pulse width of this DC voltage pulse is modulated to transmit the data in the form of a coded data. The master station 1 designates an address of a desired slave station 2-*i* by this data transmission. Then, when the data is transmitted from the designated slave station 2-*i*, the slave station 2-*i* receives the clock pulse train transmitted subsequent to the data transmission from the master station 1. Another pulse is added to the received pulse on the receiving side, so that the pulse width of the pulse formed by the short-circuit between the lines is selectively expanded to transmit the data to the master station 1 from the slave station 2-*i*. Consequently, the data transmission rate is improved by shortening the pulse period of the clock pulse train. In addition, it is not required to provide a synchronizing circuit on the side of the slave station 2-*i*.

Figure 4:
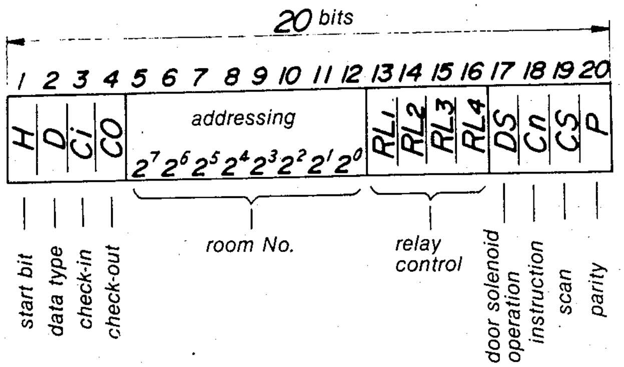
FIG. 4 illustrates a format of a command data transmitted from the master station.

An example of a format of the data transmitted from the master station 1 to the slave stations 2-*i*, as mentioned above, is shown in FIG. 4. The command data to be transmitted from the master station 1 is formed, for example, of 20 bits as shown in FIG. 4. A data type bit D, which is the second bit following a first start bit H, designates a type of a commodity sales data to be transmitted from the slave station, i.e., the number of the sold commodities or the number of the commodities retained in the vending machine. A check-in bit Ci and a check-out bit Co, respectively the 3rd and 4th bits, represent a job assignment at the hotel front desk. More specifically, those bits Ci and Co are used as follows. In the case of the check-in, the data of the number of the sold commodities in the controller in the vending machine is reset and the data of the number of the commodities retained in the vending machine is set as the reference number data, while in the case of the check-out, the commodity sales data relating to the most updated number of the commodities by calculating the number of the commodities retained in the vending machine is formed and transmitted to the master station. The 13th to 17th bits following the eight bits from the 5th to 12th bits which designate and address of the slave station are control instruction data in the case where the vending machine in a guest room is operated by the master station, and relay control bits RL1–RL4 from the 13th to 16th bits instruct the operations of the respective relays in the vending machine in the guest room. A door solenoid bit DS of the 17th bit instructs the opening or closing of the door for the commodity sales. Actual operations in accordance with these control instruction data are executed by an operation command bit Cn of the 18th bit. Instead of this operation command, when the 3rd bit instructs the check-in or the 4th bit instructs the check-out, the operations in accordance with these control instruction data may be performed at the time of the instructions of the data. A scan bit of the 19th bit, i.e., a scanning command Cs, is for merely transferring sequentially the commodity sales data stored in the controller, without instructing a particular operation to the vending machine in the slave station, to examine the conditions of the respective vending machines at the master station. In the case of this scanning, the battery in the vending machine is not consumed, since the vending machine is not operated.

Figure 5:
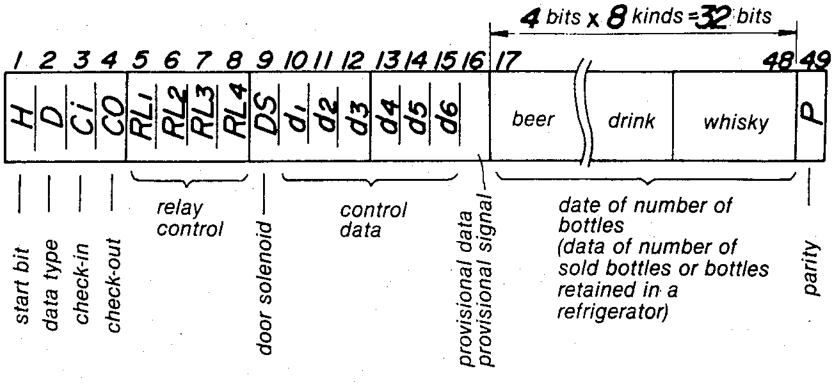
FIG. 5 illustrates a format of the commodity sales data transmitted from the slave station when it is addressed.

FIG. 5 illustrates an example of a format of the transmission data to be transmitted in reply to the master station 1 from the slave station 2-*i*, the address of which has been designated by the command data transmitted in the form of the above-mentioned format from the master station 1. The data to be transmitted to the master station 1 from the slave station 2-*i* are, for example, as illustrated in FIG. 5. The first through 9th bits correspond to bits one through four and thirteen through 17th in the data from the master station illustrated in FIG. 4, the 10th through 15th bits are control data bits d1–d6 representing opening and closing conditions of the signal contacts in the vending machine, a condition of a power supply, opening and closing conditions of the doors for commodity sales and for commodity supply in each of the slave stations, respectively. A provisional data signal of the 16th bit is set at a high logic level "1" at the time of the first data transmission from a slave station in response to the transmission request from the master station 1. Thus the slave station 2-*i* transmits relay control bits RL1–RL4 from the 5th to 9th bits which are the same as those transmitted from the master station and control data from the 10th to 16th bits which are stored in the controller and the operating status data stored in the controller. In addition, the operating status data resulting from the operation of the respective relays and the door solenoids in accordance with the instructions by the control instruction data from the 13th to the 17th bits in the command data from the master station 1 are transmitted during the next transmission by the slave station by the 5th to 9th bits.

The commodity sales data of the 17th through forty-eight bits are for transmitting either the number of sold commodities, by kind, or the number of commodities retained at present in the vending machine as selected by designation data transmitted from the master station 1. In either case of the transmission of the number of the sold commodities or the number of the thus retained commodities, the bit positions are allotted in advance to various types of commodities such as beer, during, whisky and so on, so that these bit positions only transfer the number of commodities corresponding to the respective bit positions. As a result, efficiency in data transmission is achieved.

Figure 6:
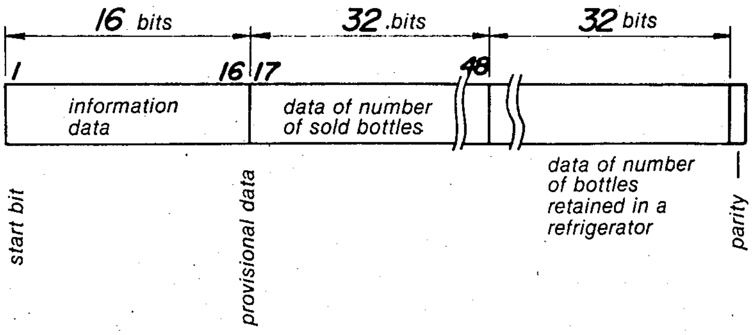
FIG. 6 illustrates a format of the commodity sales data transmitted from the slave station when each of the slave stations are scanned.

FIG. 6 illustrates an example of a format of the data transmitted from the respective slave stations at the time of scanning in which the present commodity sales data are sequentially collected from the respective slave stations 2-1 through 2-*n* after the transmission of the scanning command from the master station 1. The first to 16th bits of this format are the same as those in the data format shown in FIG. 5. However, the operating status data and the control data stored in the controller at the time of the transmission are transmitted as they are in contrast to the previous transmission where the relay control bits were mere repetitions of data transmitted from the master station. From the 17th bit, both of the number of the sold commodities, by kind of commodity, and the number of the commodities retained at present in the vending machine which are stored in the controller at the time of the transmission are transmitted as they are.

Figure 7:
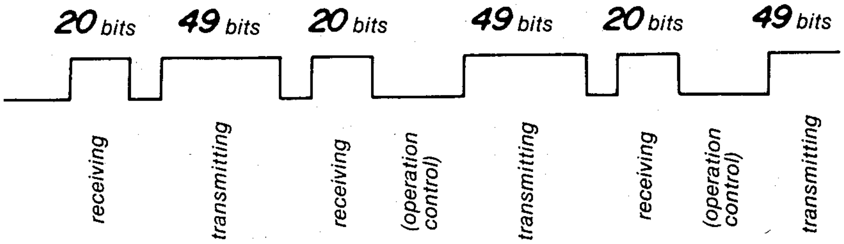
FIG. 7 illustrates a timing of the data transmission when it is addressed.
Figure 8:
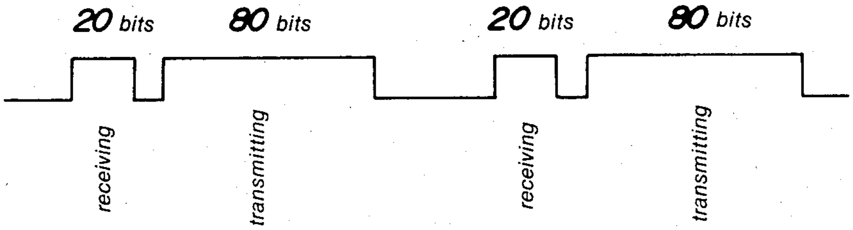
FIG. 8 illustrates a timing of the data transmission when the slave stations are scanned.

FIG. 7 illustrates a timing chart for the data transmission and reception where the commodity sales data is transmitted from the slave station 2-*i*, the address of which has been designated by the master station 1, as described above. FIG. 8 illustrates a timing chart for the data transmission and reception where the commodity sales data are sequentially transmitted to the master station 1 from the respective slave stations 2-1 to 2-*n* at the time of scanning.

An embodiment of a detailed arrangement of the wire data transmission system shown in FIG. 1 is shown in FIG. 12. In the wired transmission system shown in FIG. 12, the master station is provided with a "0" signal transmitter 111 and a "1" signal transmitter 112, which transmit signals "0" and "1", respectively. These signals constitute code signals "0" and "1" serving as identification signals in the respective slave stations, as the calling pulse train of the transmission signal from the master station. The "0" signal per se can be used as a response clock pulse train in the transmission signal from the master station. Reference numeral 113 is a rise detector adapted to generate a high level output for a duration from an instant that a signal from the "0" signal transmitter 111 changes from a space signal to a mark signal to an instant that the mark signal thus changed returns to the space signal. Reference numeral 114 is a transmitting register adapted to output the store data, while shifting it bit by bit at a timing of a signal applied from the rise detector 113 to a clock terminal CK.

The transmitters 111 and 112 and the register 114 are controlled by a central processing unit (CPU) 131 in accordance with an input to the CPU 131 from a keyboard 132. One example of the controlling steps of the CPU 131 will be explained with reference to FIGS. 13 and 14.

Reference numeral 115 is a receiving register for reading and shifting an input signal bit by bit at a timing of the signal from the rise detector 113 which is applied to the clock terminal CK to store the input signal in this register 115. The "0" signal and "1" signal from the transmitters 111 and 112 are applied to AND gates A1 and A2, respectively. By the transmitting code signal from the transmitting register 114 and the inverted signal through an inverter $I_1$, the AND gates A2 and A1 are respectively controlled in correspondence to the "1" and "0" signals of the transmitting code signal. The "0" signal and the "1" signal which are combined in the order of the transmitting code signals are applied through an OR gate 01 to an AND gate A4. In accordance with a transmission command signal applied to the AND gate A4, the "0" and "1" signals are applied through an OR gate 02 to the base of the transmitting switching transistor T1 to drive the switching transistor T1 so as to short-circuit the terminals P1 and P2 of the double line type signal lines in accordance with the transmitting code. The "0" signal from the transmitter 111 for use in the transmission of the transmitting code signal is applied to the rise detector 113 to produce an in-station clock pulse having a proper pulse width, in accordance with the leading edge of the signal waveform. The in-station clock pulse is applied to the transmitting register 114 and the receiving register 115 both of which are formed by shift registers to control the reading of a transmitting code signal and the writing of a receiving code signal from a terminal station. The in-station clock pulse is further delayed properly through a delay circuit 119 to reset a preset counter 118 in a signal discriminating circuit 116, thereby resetting the counting operation for discriminating "0" from "1" in the received code signal, which will be described later. Furthermore, the "0" signal from the transmitter 111 is applied through an inverter $I_2$ to an AND gate A5, as an inverted signal of a response clock pulse train.

On the other hand, the master station detects a change in a voltage waveform, which is formed at the terminal P1 of the signal line by the short-circuiting the double line signal lines in accordance with the response code signal in the slave station, in order to receive the response code signal from the slave station. For that purpose, the voltage waveform signal at the terminal P1 is applied to the comparator Q1 consisting of a feedback type differential amplifier with a resistor R17 in a level detector 120 to compare the signal with a threshold level of a reference voltage $V_T$, so that a high level duration in the waveform as the received code signal is clearly discriminated from a low level duration therein. The threshold level comparison output from the comparator Q1 is applied through a resistor R18 and an inverter $I_3$ to the AND gate A5, so that the output is gated by the inverted signal of the above-described response clock pulse train to derive from the AND gate A5 a low level portion alone of the voltage waveform at the terminal P1 of the signal line, which is applied to the signal discriminating circuit 116. In the signal discriminating circuit 116, the low level portion of the received voltage waveform which is derived through the inverter $I_3$ and the AND gate A5 is applied to an AND gate A6, so that a timing clock pulse from a clock transmitter 117 is allowed to pass through the AND gate A6 only for the low level duration. The timing clock pulse from the AND gate A6 is applied to the preset counter 118, so that a time length of the low level duration is counted. Only when the counting result of the low level duration exceeds a preset value suitable for discriminating a difference in time length between the low level durations representing "1" and "0" in the received code signal, a counter output signal indicative of the received code signal "1" is produced. The received code signal resulting from such the signal discrimination is written in a receiving register 126. Further, the preset counter 118 is reset at every time of the received code signal "1" or "0", as described above.

Further, when receiving the response code signal from the slave station, the "0" signal from the transmitter 111 is transmitted in advance as response clock pulse train through the AND gate A3 and the OR gate 02 in accordance with the receiving command signal, as a matter of course.

Next, in the slave station in the wired data transmission system shown in FIG. 12, a transmitting voltage waveform signal from the master station which develops at terminals P3 and P4 of the pair of the signal lines is applied to a level detector 121. In the level detector 121, the transmitting voltage waveform signal is supplied to a comparator Q2 consisting of a feedback type differential amplifier with a resistor R19, so that a threshold level comparison of the signal with the reference voltage $V_T'$ properly set in the manner described above is made to clearly discriminate a high level duration of the transmitting voltage waveform from a low level duration thereof. The threshold comparison output is supplied through a resistor R20 to a fall detecting circuit 122, which detects a low level duration in the inverted transmitting voltage waveform, namely, a high level duration of the original signal. The detection output signal is supplied via an AND gate A7 to a signal discriminating circuit 123 in accordance with a receiving command signal. In the signal discriminating circuit 123, a low level duration signal of the detection output signal is applied to an AND gate A9, and a timing clock pulse from a clock transmitter 124 is allowed to pass through the AND gate A9 to a preset counter 125, so that a time length of the low level duration in the transmitting voltage waveform, namely, a time length of a high level duration in the original transmitting code signal, is counted. Only when the result of the count exceeds a preset value preferable for discriminating a difference in time length between the low level durations representing "1" and "0" in the original transmitting code signal, a counter output signal representing "1" of the original transmitting code signal is produced. The received code signal obtained by the result of this signal discrimination is written in the receiving register 126 while shifting the received code signal bit by bit at a timing of the output from the fall detecting circuit 122. A fall detecting output pulse from the fall detecting circuit 122 is applied as a clock signal through an inverter $I_4$ to the receiving register 126 in the form of a shift register, and is also applied to the preset counter 125 after the output pulse is delayed properly by a delay circuit 127, so that the preset counter 125 is reset at every time of "1" and "0" of the received code signal.

When the transmitting signal from the master station thus received by the slave station in the manner described above is the identification signal which designates the slave station in question, the fall detecting pulse with respect to a response clock pulse train subsequently transmitted from the master station after the lapse of a given duration of time from the reception of the identification signal is supplied from the fall detecting circuit 122 to the AND gate A8, and then, as a clock signal, to a transmitting register 128 in accordance with a transmitting command signal, thereby driving the transmitting register 128 consisting of a shift register, so that the code signal of information to be transmitted to the center station, for example, articles sales data of the vending machine, is read out while shifting the code signal bit by bit. The responsive code signal thus readout is directly applied as a set input to a flip-flop 129, and as a reset input thereto through an inverter $I_5$. The output pulse from the flip-flop 129 is applied to a timer 130 to produce an output signal having a high level for a predetermined time duration, for example, a "1" signal having a proper time length when the timer 130 receives the mark signal of a high level. The responsive code signal consisting of such the "1" signal is applied to the base of the switching transistor T2, thereby short-circuiting the double line type signal lines in response to the responsive code signal. In this manner the pulse width modulation type responsive signal is transmitted.

In practice, in order to avoid the occurrence of a failure due to a difference in DC potential between the signal lines and the master station equipment as well as the slave station equipments in the detailed circuit arrangement shown in FIG. 12, it is preferable that in the master station the level detector 120 and the inverter $I_3$ are coupled by a photocoupler and the OR gate 02 and the switching transistor T1 are coupled by a photocoupler, that in the slave station, the level detector 121 and the fall detecting circuit 122 are coupled by a photocoupler and the timer 130 and the switching transistor T2 are coupled by a photocoupler, and that a voltage stabilizing circuit consisting of a resistor and a Zener diode is connected between the input terminals P3 and P4.

FIG. 13 shows a flowchart of operations carried out by the master station 1 shown in FIG. 12, when the master station 1 selects the address of a slave station by the keyboard 132 so as to cause the slave station 2-1 to transmit commodity sales data. FIG. 14 shows an example of a flowchart of operations carried out by the slave station 2-1 addressed to transmit commodity sales data to the master station 1 therefrom.

Next, referring to FIGS. 2, 3, 4, 5, 7, 12, 13 and 14, the mode of operation for transmitting commodity sales data from the addressed slave station 2-1 to the master station 1 in which the collation of commodity sales data is carried out will be described in detail.

First, in first step A1 shown in FIG. 13, the master station 1 reads out, as an ordinary process, a demand for operation of and transmission to a slave station from a keyboard (not shown) and then at step A2 whether or not the input readout from the keyboard includes the demand for operation and transmission is checked. If the input does not include this demand, the operation returns to step A1 and steps A1 and A2 are repeated until the demand for operation and transmission is obtained. On the other hand, if the input includes the demand, the master station 1 prepares to transmit data based on the demanded items in step A3. A transmission format consists of 20 bits as shown in FIG. 4 and includes not only a slave station address (a guest room number) but also various control data (from the 13th to the 17th bit) for operating various parts of the slave station. Upon the completion of the transmission data, it is transmitted to the slave station at step A4. In this case, as shown in FIG. 2, transmission data includes "1"s ("H"s) each representing that the output transistor $Tr_{11}$ shown in FIG. 1 or T1 in FIG. 12 is turned on for a relatively long period of time and "0"s ("L"s) each representing the output transistor $Tr_{11}$ or T1 is turned on for a relatively short period of time.

When the transmission data is transmitted from the master station 1 to the respective slave stations 2-1, ---, **2-*n*, each slave station starts an interrupt process upon the reception of the transmission data so that the slave station operates as shown in FIG. 14. First, at step B1, the transmission data as shown in FIG. 4 transmitted from the master station 1 is received and processed. This step B2 checks whether or not the transmission data has been received. Upon the reception of the data transmission, it is checked whether or not the received data format corresponds to the format as shown in FIG. 4 in step B3. If they do not correspond to each other, the received data is ignored and the interruption process is terminated to return to the normal process. If they correspond to each other correctly, step B4 is carried out to check whether or not the slave station address in the received data corresponds to the address assigned to the slave station. If they do not correspond to each other, the transmission data is intended to be transmitted to another slave station so that the received data is ignored and the interruption process is terminated to return to the normal process. On the other hand, when the addresses do correspond to each other, the transmitted data is to be received by the slave station so that step B5 is carried out. At this step B5, the received data is stored in a received data buffer in the CPU 131 in order to check if the received data is one first transmitted from the master station or one second transmitted from the master station. If the received data is the first data transmitted from the master station, no data is stored in the received data buffer so that the received data does not coincide with the contents in the buffer. As a result, step B6 is carried out. That is, the first flag is reset and then step B7 is carried out so that the received data is stored into a received data buffer. Thereafter, step B8 is carried out to check if the first flag exists or not. In this case, the first flag is reset in step B6, so that it is judged that there exists no first flag. Thereafter, the subsequent step B9 is carried out to set the first flag so that the reception of the first received data is stored. Next, the step B10 is carried out to set a virtual flag. When the first transmitted data is received, each part will not respond to the control data in the received data so that the control data per se in the received data is set as a virtual flag, as if each part responded to the control data. For instance, the 13th, ---, 17th bits of the data received from the master station 1 are "1"s as shown in FIG. 4, each part of the slave station is actuated. On the other hand, if they are "0"s, they will not actuate respective parts of the slave station. However, it is assumed that each part of the slave station be actuated (it is not actually actuated at all) so that the 5th–9th bits of data shown in FIG. 5 transmitted from the slave station 2-1 to the master station 1 are made equal to the control data. Next, step B11 is carried out so that in order to prepare the format as shown in FIG. 5, the transmission data is edited in such a way that the 1st–9th bits correspond to the 1st–4th bits and the 13th–17th bits; the 10th–15th bits represent actual operation data of each part of the slave station; and the 17th–48th bits represent the commodity sales data stored at present. The first transmitted data is data prepared on the assumption that each part of the slave station 1 has been operated in response to the control data and does not coincide with the actual data. Therefore, a virtual data at the 16th bit is "H". The master station 1 waits for 20 msec during which the data is transmitted to the slave station 2-1 in step A5 in FIG. 13 and then the slave station 2-1 carries out steps B1–B11 shown in FIG. 14. Thereafter, at step A6, the sync clock signal as shown in FIG. 3A is generated. Then, at step B12 in FIG. 14, the slave station 2-1 detects the sync clock signal and delivers the binary data signal as shown in FIG. 3B in response to the transmission data as shown in FIG. 5. The data transmitted from the slave station and received by the master station has a waveform as shown in FIG. 3C**. The transmission between the master and slave stations is accomplished during steps A3, A4, A5 and A6.

At step A7, the master station 1 checks if the data received at step A6 coincides with the first data which the master station 1 has transmitted to the slave station 2-1. If they do not coincide with each other, the transmission between the master and slave stations has failed. Therefore, at step A8, a re-transmission waiting time is consumed and step A3 is carried out to transmit the data for the first time. If the data transmitted from the master station 1 to the slave station 2-1 is determined to coincide with the data transmitted back from the slave station 2-1 to the master station 1 at step A7, the subsequent step A9 is carried out to check whether or not the received data format is correct. If the received data format is not correct, the transmission is determined as being failed so that step A8 is carried out. If the format is correct, then step A10 is carried out to check if the virtual data at the 16th bit of the received data is "H". Since the virtual data is "H" in the data received by the first transmission, if the virtual data is not "H", step A8 is carried out to start the re-transmission as described above. However, if the virtual data is "H", then step A11 is carried out to start the second transmission. This step A11 provides a 30 msec waiting time for switching the transmission. Next, step A12 is carried out to transmit the data identical with the data transmitted by the first transmission to the slave station 2-1.

As in the case of the first transmission, when the slave stations 2-1, 2-2, ---, and **2-*n* receive the second transmitted data, they start an interrupt service routine and operate as shown in FIG. 14. First, at step B1, they receive the data as shown in FIG. 4 transmitted from the master station 1 and at step B2, it is confirmed whether or not such data has been received. Upon the reception of the transmitted data, it is checked if the received data format coincides with the format as shown in FIG. 4 in step B3. If the format is abnormal or not correct, the received data is ignored and the interrupt service routine is terminated to resume the normal routine. On the other hand, when the format is correct, step B4 is carried out to check if the slave station address in the received data coincides with the address assigned to the slave station 2-1 to which the data is transmitted. If the addresses do not coincide with each other, it is determined that the received data is intended to be transmitted to another slave station other than this slave station. As a result, the received data is ignored and the interrupt service routine is terminated to resume the normal routine. On the other hand, when the addresses coincide with each other, step B5 is carried out because the data is intended to be transmitted to this specific slave station 2-1. In step B5, in order to determined whether the received data is firstly or secondly transmitted from the master station 1, the received data is compared with the data stored in the received data buffer. If the received data is the second data transmitted from the master station 1, step B8 is carried out, because the same data is stored in the received data buffer. If the received data is the second transmitted data, step B13 is carried out because the first flag exists. At step B13, in response to the control data transmitted from the master station, operation commands are delivered from the output ports to actuate each part of the slave station 2-1. Next, step B14 is carried out to check if the third bit represents "check-in". If "check-in" is confirmed, refrigerator data is read out in step B15 and at step B16 the readout data is set as a reference number data. If step B14 confirms "check-in", step B17 is carried out to check if the 4th bit represents "check-out". If "check-out" is confirmed, the refrigerator data is read out at step B18. Then, at step B19, a number of articles sold is computed. This computation is carried out by subtracting the data read out at step B18 from the reference number data. Upon the completion of steps B16 and B19 or when step B17 does not confirm "check-out", the step B20 is carried out to set the 16th bit (virtual data) to "L" in the data shown in FIG. 5 and to be transmitted back to the master station. At step B21, the data to be transmitted is edited in such a way that of the transmission data format shown in FIG. 5**, the 5th–9th bits represent the conditions of respective parts actuated; the 10th–15th bits represent conditions of operations being carried out at present; the 16th bit is set to "L" and the 17th–48th bits represent the data obtained in step B16 or B19. At step B22, the data thus edited is transmitted to the master station in response to the sync clock signal transmitted from the master station.

After the master station 1 has transmitted data to the slave stations in step A12, the slave stations process based on the received data. The subsequent step A13 provides a 200 msec waiting time for editing the transmission data. Thereafter, at step A14, the master station 1 transmits the sync clock signal as shown in FIG. 3A to the slave stations and receives from the slave station data whose waveform is shown in FIG. 3C. The second transmission is accomplished during steps A11, A12, A13 and A14. Upon the completion of the second transmission in step A15, the master station 1 checks if the received data coincides with the data transmitted to the slave station. If they do not coincide with each other, the transmission has failed so that we must return to step A8 to repeat the first transmission. However, if they coincide with each other, step A16 is carried out to check if the received data format is correct. If the format is not correct, the transmission has failed so that we must return to step A8 to repeat the first transmission. However, if the format is correct, step A17 is carried out to check if the virtual data is "L". Data transmitted by the second transmission is formal data, so that the virtual data must be "L". However, if the virtual data is "H", step A11 is carried out again to repeat the second transmission, but if the virtual data is "L", step A18 is carried out. FIG. 7 is a timing chart when the second transmission is repeated. At step A18, the master station 1 checks and stores the condition of each part of the slave station based on the data transmitted back from the slave station. The condition of each part of the slave station is the interruption of power supply to the slave station, excess of supplementing or the like. After the conditions of the slave station have been checked, step A19 is carried out. That is, the commodity sales data obtained by the first transmission is compared with the commodity sales data obtained by the second transmission. If they coincide with each other, the first step A1 is carried out again so that the normal processing such as liquidation in the case of "check-out" or recording of numbers of articles stored in a refrigerator is carried out. However, if they do not coincide with each other, step A8 is carried out again to repeat the first transmission because it is considered that data has been changed due to the second transmission. As described above, the collation of commodity sales data is carried out when the address of a slave station is designated.

On the other hand, when a plurality of slave stations 2-*i* are sequentially scanned only to collect data without permitting operations, the master station 1 transmits to the slave stations the transmission data format as shown in FIG. 4 in which the operation command in the 18th bit is "0", thereby rendering the control data in the 13th–17th bits ineffective and in which the scan signal in the 19th bit is "1". In this case, each slave station 2-*i* merely transmits and reports to the master station 1 the number of the sold commodities according to commodity type and the number of the unsold commodities which are stored in the controller in the automatic vending machine. The master station 1 simply checks the present commodity sales condition in each slave station 2-*i*. In this case, the master station 1 will not immediately make a liquidation or the like based upon the collected commodity sales data received. It follows therefore that it is not necessary at all to collate and confirm every commodity sales data from each slave station 2-*i*. Therefore, as shown in FIG. 8, each slave station 2-*i* only immediately transmits the 80-bit data in the form of the format as shown in FIG. 6 subsequent to the 20-bit command data from the master station 1. Thus, the repetitive transmissions as shown in FIG. 7 will not be carried out.

More specifically, the sequential scanning of respective slave stations 2-*i* is carried out to collect the commodity sales data at one time in advance in order that the front desk where the master station 1 is installed manages the desired business controls such as the collection of commodity sales data, monitors the abnormal conditions or malfunctions of the respective slave stations 2-*i*, or to process liquidation in the case of power interruption of the operation of each vending system due to power interruption based on the previously collected commodity sales data. As a result, no high-speed data transmission is required and therefore both of the number of sold commodities depending upon the kinds of commodities and the number of the commodities still retained at present in the refrigerator or the like of the vending machine are collected as the commodity sales data.

The method for sequentially scanning a plurality of slave stations 2-*i* in the manner described above is well known in the art so that no further description will be made.

Further, the collation and confirmation of the commodity sales data by repetitive or multiple transmission of the same data results in the improvement of the reliability in data transmission and the increase of a data transmission time. So far data transmission has been carried out in accordance with the power supply period, but according to the present invention, data transmission can be carried out by clock pulses having any desired clock pulse period, so that the data is transmitted at a speed higher than can be achieved in a the conventional data transmission system.

Figure 9:
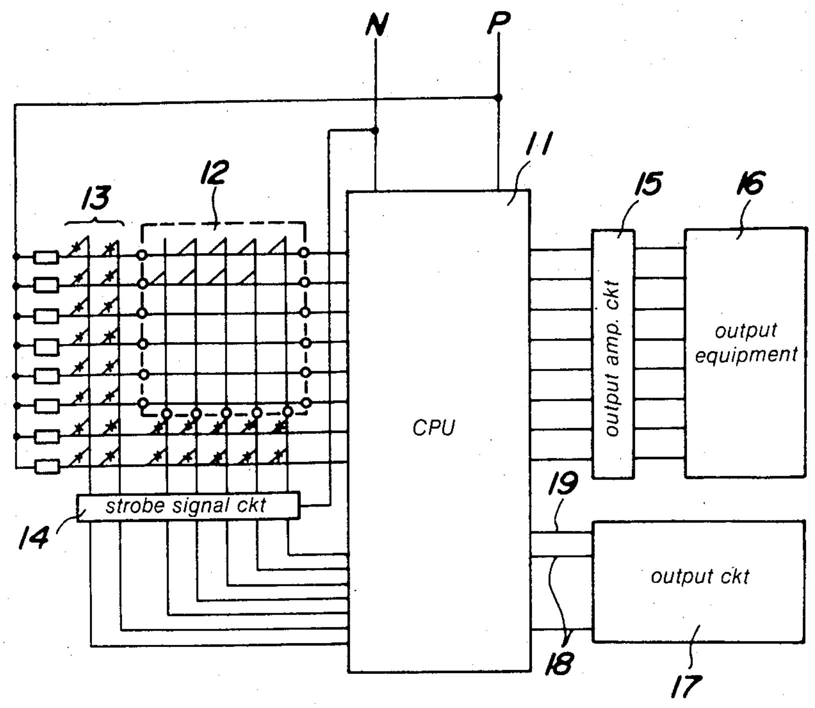
FIG. 9 is a block diagram showing an embodiment of a circuit arrangement of the sales data processing system in a wired commodity vending system according to the present invention.

An example of a schematic construction of a sales data processing system in a wired commodity sales system according to the present invention is shown in FIG. 9. In the sales data processing system with the construction shown in FIG. 9, reference numeral 11 designates a central processing unit for controlling the overall system which may be formed by a microcomputer or the like. The central processing unit 11 senses a state of a commodity rack 12 having a sensor matrix for sensing the presence or absence of the commodities to be accommodated at given locations within the vending machine and an ON/OFF state of a control contact 13, and performs arithmetic operations of the data representing a state of sales and controls the respective circuits by the result of the operations. A strobe signal generating circuit 14 produces a strobe signal to write the sales data from a contact matrix constructed by sensors for sensing the presence or absence of the commodities and control contacts into the central processing unit 11. The strobe signal generating circuit 14 is controlled by the central processing unit 11. An output amplifier circuit 15 amplifies a control output drive signal from the central processing unit 11 on the basis of the sales data from the contact matrix. An output unit 16 responds to the drive signal from the output amplifier circuit 15 to drive various operation parts in the vending machine. For example, the output unit 16 locks the outer door for taking out the commodities and releases the same. A front unit 17 receives the sales data processed in the central processing unit 11, through the data transmission line for processing the same.

Figure 10:
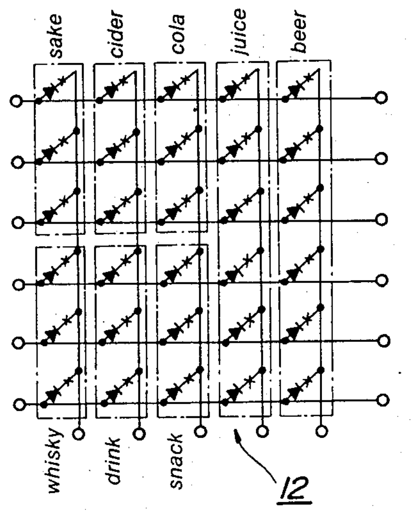
FIG. 10 is a circuit diagram showing an embodiment of a circuit construction of a sensor matrix shown in FIG. 9.

The operation of the sales data processing system with such a construction will be described. When the sales data processing unit in the vending machine for each guest room is set in an operation mode, the control contact 3 for sensing the set state is turned on and the central processing unit 11 confirms the set state. At the same time, the data such as the numbers of guest rooms, the numbers of commodities for each type of commodity, and control data are transferred from the front unit 17 to the central processing unit 11. The central processing unit 11 checks the number of the guest room, and data normality or abnormality such as the coincidence of the control data or the coincidence of the parties. If the data are normal, the commodities contained may be ready for sales through the opening and closing of the outer door. At this time, the sales indicating lamp is lit and the locking of the outer door is released. In the sales ready condition, the hotel guest can open and close the outer door and take out a desired commodity from the commodity containing rack. As shown in FIG. 10, the commodity containing rack is provided with sensors for the respective types of commodities. The commodity accommodating positions are previously selected for each commodity item. Accordingly, if each commodity item is taken out from the rack, the contact of the corresponding sensor as indicated by a symbol x in FIG. 10 is closed. In response to the closed sensor contact within the commodity containing rack, the central processing unit 11 detects the type and the number of the sold commodities, calculates the number of the sold commodities by kind of commodity and updates the sales data with the format as illustrated in FIG. 5.

The vending machine for the guest rooms in the hotel with the construction and operations as mentioned above has the following features for the sales data control system.

(1) As for the material for preparing the final sales data, the central processing unit has for each type or kind of commodity data representing a reference number of commodities which is to be accommodated in the refrigerator, data representing the number of sold commodities and auxiliary data representing the number of commodities retained in the refrigerator, by kind, respectively.

(2) The above-mentioned data are prepared in the following manner:

The data for the reference number of commodities:

As the number of commodities accommodated after the sales starts, this data is updated by supplying the commodities from the number of the commodities accommodated at the time of check-in.

The data for the number of the sold commodities:

The number of the commodities taken out from the rack.

The data for the number of commodities retained in the refrigerator:

The number of the commodities retained in the refrigerator.

(3) The above-mentioned data have the following relationship:

(Data for the number of the sold commodities)=-(Data for the reference number of the commodities)−(Data for the number of the commodities retained in the refrigerator).

(4) The above-described data calculation is performed in a closed condition of the outer door for taking out the commodities after it is opened.

(5) After or during the supplement of the commodities to be contained in the refrigerator, a calculation is made concerning whether the number of the commodities retained in the refrigerator is under the limit of the data for the reference number of the commodities. When an excessive supplement is carried out, an abnormality is indicated or a sales lock is effected.

(6) The indication of an abnormality based on an excessive supplement is performed by flashing a sales indicating lamp, a buzzer or the like.

In addition, although the practical calculation of each of the above-mentioned data for the numbers of commodities can be effected in various manners, a feature of the vending system according to the present invention is that the calculation is made only in the closed state of the outer door after the commodity is delivered, that, whenever the commodity is delivered, the sales data obtained as a result of the above calculation are refreshed and written in the memory at each time of the delivery of commodity, and that each sales data can be checked mutually according to the above-mentioned equations.

Figures 11A, 11B:
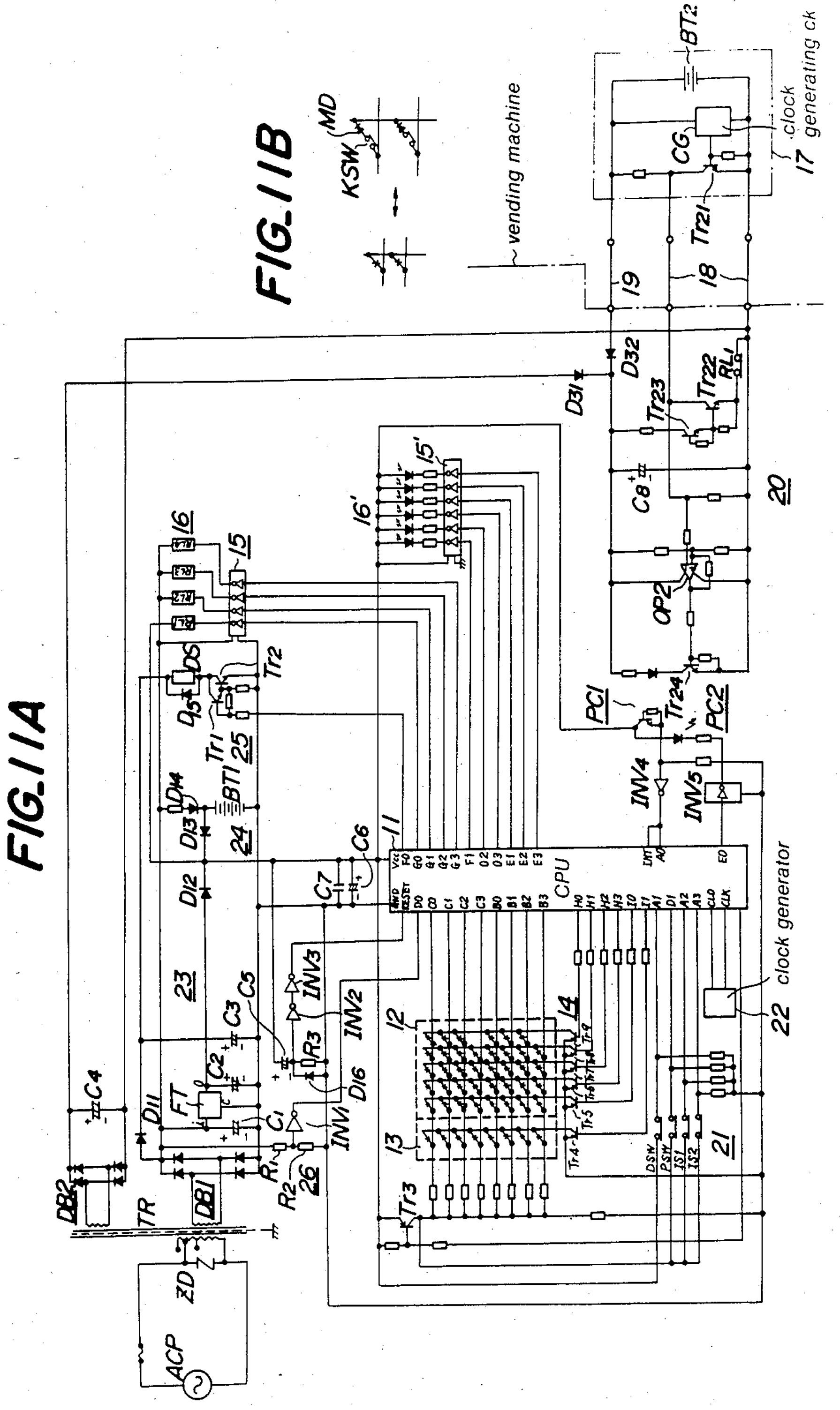
FIG. 11A is a block diagram showing an embodiment of a detailed construction of the sales data processing system.
FIG. 11B is a circuit diagram showing an embodiment of the key sensor shown in FIG. 11A.

Next, an example of a detailed configuration of the sales data processing system in a wired commodity vending system according to the present invention is shown in FIG. 11A. In this configuration, a transmitting and receiving circuit 20 connected to the data transmission line of the vending machine such as a refrigerator for a guest room is coupled to the sales data processing unit proper while the circuit 20 is electrically insulated from the sales data processing unit by a receiving photocoupler PC1 and a transmitting photocoupler PC2 (for instance, PS2001) in order to increase noise immunity. The command signal from the front unit 17 is applied to the sales data processing unit proper after the level of the command signal is discriminated by an operational amplifier OP2, the lock of the outer door of the vending machine such as the refrigerator is released in response to the command signal from the front unit 17, so that the commodity sales is available, and the number of the commodities retained in the refrigerator is detected to prepare the above-mentioned commodity sales data which is transferred to the front unit 17. This sales data processing is controlled by the central processing unit 11.

In FIG. 11A, the front unit comprises a battery BT2 (for instance, +24 V), a clock generator CG and an output transistor Tr21, an output of which is applied to signal lines 18, 18. Reference numeral 19 denotes a power supply line for a receiving circuit 20 of the vending machine such as the refrigerator. The receiving circuit 20 is provided with diodes D31, D32 to supply the DC electric power derived from an AC electric power source ACP through a diode bridge DB2 and a capacitor C4 also, and further comprises the operational amplifier OP2 together with controlling transistors Tr22, Tr23, a capacitor C8 and an output transistor Tr24 (for instance, 2SC945). Inverters INV4, INV5 (for instance, MC 14049 BP) are inserted between the central processing unit 11 and photocouplers PC1 and PC2, respectively, to provide signal delivery between the receiving circuit 20 and the central processing unit 11.

The central processing unit 11 is in the form of a one-clip microcomputer (for instance, $\mu$ COM 43C) comprising an arithmetic unit, a read only memory (ROM), a random access memory (RAM) and so on and is driven by the clock generator 22 so as to serve for the signal delivery with the front unit 17, the processing of signals derived from a key matrix circuit 12 of the commodity rack and a controlling contact circuit 13 and the formation of the sales data to be transmitted. The key matrix circuit 12 is provided with key sensors arranged in a matrix of, for instance, eight rows and six columns, each of which key sensors comprises a key switch KSW and a diode MD, as shown in FIG. 11B. Those key switches KSW consist of thirty sensor switches corresponding respective to thirty items of commodities including eight kinds, eight switches indicating a vending machine number of 256 numbers and so on. The key switches KSW are driven by a strobe signal circuit 14 comprising transistors Tr4 to Tr9 (for example, 2SC 943). A sensor input circuit 21 connected similarly to the central processing unit 11 is composed of four sensor input switches in total, that is, a door switch DSW for detecting the opening or closing of the outer door of the vending machine, a pin switch PSW for detecting whether the outer door is locked or not and two indicator switches IS1 and IS2 corresponding to the information of commodity supplement completion in the vending machine and the like.

On the other hand, an outer door opening/closing solenoid DS to be driven by the central processing unit 11 is driven thereby through a transistor amplifier 25, since the driving current of the solenoid DS is especially large. Respective output relay circuits 16 comprising relays RL1 to RL4 for discharging commodities at the time of commodity sales and the like are driven by separate transistor relay driving circuits 15 (for instance, ULN 2004A), and further an indicating circuit 16' comprising eight emitting diodes (for instance, SR103D) for indicating operation states of the vending machine is driven similarly by another transistor driving circuit 15' (for instance, ULN 2004A).

In addition, these components are energized by a power supply circuit 23 having a diode bridge DB1 for rectifying the AC power from the AC power source ACP, while the voltage to be supplied to the central processing unit 11 is stabilized by a three-terminal voltage stabilizing device FT, and further a power failure detecting circuit 26 is provided for detecting the failure of the AC power source or a voltage drop from a predetermined level. A back-up battery power source 24 is provided for preventing the breakdown of the memories in the central processing unit 11 at the time of power failure. A reset circuit 27 for the central processing unit 11 is also provided.

Furthermore, in FIG. 11A, ZD is a Zener diode (for instance, ENA 650-11), and TR is a transformer. The power supply circuit 23 has a diode bridge DB, capacitors C1 to C3, diodes D11 and D12 (for instance, SiB01-06) and a three-terminal voltage stabilizing device FT (for instance, μ A78M06C). The back-up battery power source 24 is composed of a battery BT1 (for instance, a series connection of four Ni-Cd batteries [1.2 V]) and diodes D13 and D14. The door solenoid driving transistor amplifier 25 comprises output transistors Tr1 and Tr2, outputs of which energize the solenoid DS. In the power failure detecting circuit 26, an output voltage from the diode bridge DB is taken out through a voltage divider having resistors R1 and R2, a voltage division output of which is taken out as a power failure detection output through an inverter INV1 (for instance, MC14049BP). The reset circuit 27 is composed of a resistor R3, a capacitor C5, inverters INV2 and INV3 and a diode D16 (for instance, IS751). In FIG. 11A, C6 and C7 are capacitors and Tr3 is a transistor (for instance, 2SA696).

INDUSTRIAL APPLICABILITY

As is apparent from the above explanation, according to the present invention, it is possible to increase the reliability and freedom of composition of commodity sales data transmission in a wired commodity sales system like a hotel vendor system, and suitable management can be performed by obtaining the operation status of the vending machine at the slave station at the front reception desk functioning as the master station.

In addition, a wired commodity sales system according to the present invention can be applied not only for a so-called hotel vendor system but also for a similar commodity sales system in a restaurant or the like.

Furthermore, according to the present invention, three kinds of sales data consisting of data representing the reference number of commodities, data representing the number of sold commodities and data representing the number of commodities retained at present in the refrigerator are calculated in a stable condition in which the outer door is closed after the completion of the sales operation, so that stable and reliable sales data can be obtained. As a result, it is possible to obtain sales data having a high reliability without being affected by user mischief or the like. Accordingly:

(1) While it is important to remove the influence of mischief or unfair use in a vending machine used in a closed guest room, according to the present invention, the sales data is prepared only when the outer door is closed, so that stability and security of the sales data are high.

(2) Even if sales data are destroyed by mischief or unfair use, it is possible to restore the destroyed sales data by referring to the data stored in the central processing unit.

(3) Conditions of commodity accommodation in the commodity rack can be always checked, so that it is possible to exclude calculation errors caused by external noise or unfair use.

(4) Only the number of sold commodities for each item is stored as sales data in a fixedly designated address, so that it is easy to reduce the memory capacity or increase the number of commodities available for sales, and further it is easy also to supervise the number of commodities which are supplemented for retention in the refrigerator.

While a preferred embodiment of a system employing the invention has been described it should be understood that the description is merely exemplary and that many modifications may be made without departing from the spirit and scope of the invention.

What is claimed is:

1. A wired commodity vending system, including a plurality of slave stations, each having a vending machine including an outer door which can be opened so that a desired number of commodities can be taken from the vending machine, an inner door which can be opened for supplementing commodities taken from the vending machine, a commodity rack for holding a plurality of different kinds of commodities and having a matrix of sensors for sensing a presence or absence of commodities held in said rack and control contacts for controlling said vending machine, and a controller for forming and storing commodity sales data, said slave stations being connected in common to a master station which manages said slave stations through data transmission lines, and respective commodity sales data for said vending machines being processed by said master station, said system comprising:

(a) means for enabling said controller to operate responsive to closing of said outer door to form and store said commodity sales data;

(b) means for transmitting address data from said master station to address a selected addressed slave station and for transmitting command data including control instruction data from said master station to said addressed slave station;

(c) means for provisionally transmitting to said master station commodity sales data stored in an addressed slave station and for retransmitting to said master station control instruction data previously transmitted to said addressed slave station from said master station in response to command data including control instruction data transmitted from said master station to said addressed slave station, an address of said addressed slave station being designated by said master station;

(d) means for transmitting said command data again from said master station to said addressed slave station subsequent to reception of said commodity sales data and said retransmitted control instruction data by said master station;

(e) means for retransmitting commodity sales data and operating status data formed by said controller after said vending machine is operated in accordance with said control instruction data to said master station from said addressed slave station which has received said control instruction data; and (f) means provided in said master station for processing said commodity sales data after said master station confirms a predetermined correspondence between repeatedly received said control instruction data and said operating status data and between provisionally transmitted sales commodity data and retransmitted sales commodity data.

2. A wired commodity vending system as claimed in claim 1, wherein said commodity sales data comprises at least one of the number of commodities by kind, which has been sold, and the number of commodities, by kind, retained at present in said vending machine, and in that, when said commodity sales data are temporarily transmitted from said addressed slave station to said master station in response to the instruction from said master station, one of (a) said number of sold commodities, by kind of commodity, and (b) said number of commodities, by kind of commodity, retained at present in said vending machine is transmitted as said commodity sales data, while, when said commodity sales data are again transmitted to said master station from each of said plurality of slave stations in response to the repeated commands from said master station, the data corresponding to the first transmitted data is transmitted as said commodity sales data.

3. A wired commodity vending system as claimed in claim 1, wherein one of (a) said number of sold commodities, by kind of commodity, and (b) said number of commodities, by kind of commodity, retained at present in said vending machine, is transmitted to said master station by said addressed slave station in response to a designation transmitted from said master station contained in said command data.

4. A wired commodity vending system as claimed in claim 1, wherein at least one of conditions of an opening or closing of said sensors, a supply or interruption of power to said vending machine, an excess supplement of commodities contained in said vending machine, and a condition of opening or closing of said control contacts in said vending machine is included in said operating status data.

5. A wired commodity vending system as claimed in claim 1, wherein said vending machine comprises a sales information detecting means for detecting the numbers of different kinds of commodities sold or retained and a memory means triggered at least after said outer door is closed for storing commodity sales information calculated by said controller and in that said commodity sales data is composed of reference number data representing a predetermined number of accommodated commodities and at least one of (a) data representing the number of commodities which have been sold after the opening and closing of said outer door and (b) data representing the number of commodities which are retained in said vending machine after the opening and closing of said outer door.

6. A wired commodity vending system as claimed in claim 5, wherein said commodity sales information is stored again in said memory means after the opening and closing of said outer door.

7. A wired commodity vending system as claimed in claim 5, wherein when said inner door has been opened and closed to supplement commodities, the number of commodities which have been supplemented at each time of the opening and closing of said inner door are added to said data for said number of commodities retained at present in said vending machine, and that when said data for said number of commodities retained at present in said vending machine exceeds said data for said reference number, an alarm is issued.

8. A method of operating a commodity vending system having a plurality of slave stations respectively associated with a plurality of vending machines, each including an outer door which can be opened so that a desired number of commodities can be taken from the vending machine and an inner door which can be opened for supplementing commodities taken from the vending machine, and a master station commonly connected to said slave stations through data transmission lines, said method comprising the steps of:

(a) forming and storing at each slave station first commodity sales data pertaining to sales of commodities from the vending machine responsive to closing of said outer door of said vending machine;

(b) transmitting address data from said master station to address a selected addressed slave station;

(c) transmitting command data including control instruction data from said master station to said addressed slave station;

(d) transmitting from said addressed slave station to said master station stored said first commodity sales data and said control instruction data previously transmitted to said addressed slave station from said master station in step (c);

(e) transmitting again said command data from said master station to said addressed slave station in response to reception by said master station of said first commodity sales data and said control instruction data transmitted from said addressed slave station;

(f) operating, at said addressed slave station, the vending machine in accordance with the control instruction data transmitted from said master station and subsequently transmitting from said addressed slave station to said master station operating status data concerning said vending machine and second commodity sales data obtained after operation of said vending machine; and (g) processing said second commodity sales data received by said master station after said master station first determines that sequentially received control instruction data transmitted in step (d) and operating status data transmitted in step (f) have a predetermined correspondence and that the first and second received commodity sales data also have a predetermined correspondence.

9. A method as claimed in claim 8, wherein said first commodity sales data comprises one of (a) the number of sold commodities by kind of commodity and (b) the number of commodities retained at present in said vending machine by kind of commodity, and said second commodity sales data comprises both said number of sold commodities and said number of commodities retained at present in said vending machine.

10. A method as claimed in claim 8, wherein said first commodity sales data comprises one of (a) the number of sold commodities by kind of commodity and (b) the number of commodities retained at present in said vending machine by kind of commodity, which is selected by said addressed slave station in response to a designation from said master station contained in said command data.

11. A method as claimed in claim 8, wherein each said vending machine includes an outer door which is opened so that a desired number of commodities can be taken from the vending machine, an inner door which is opened for supplementing commodities which can be taken from the vending machine, a commodity rack for holding a plurality of different kinds of commodities, a matrix of sensors associated with said rack for sensing the presence or absence of commodities in said rack and control contacts for controlling said vending machine, and wherein said operating status data indicates at least one of the conditions of an opening or closing of said sensors, a supply or interruption of power to said vending machine, an excess supplement of commodities contained in said vending machine, and an open or closed condition of said closed contact.

12. A method as claimed in claim 8, wherein predetermined bit positions in said first and second commodity sales data are assigned to different types of commodities.

13. A method as claimed in claim 11, wherein each said slave station has a controller therein for formulating said first and second commodity sales data, said first and second commodity sales data being formulated by said controller using reference number information representing a predetermined number of commodities by type which were accommodated in said vending machine at a particular point in time and commodity sales information which is at least one of (a) information representing the number of sold commodities and (b) information representing the number of commodities retained in a respective vending machine.

14. A method as claimed in claim 13, wherein said commodity sales information is stored by said controller each time an outer door of said vending machine is closed.

15. A method as claimed in claim 13, wherein, when said inner door has been opened and closed to supplement commodities, the number of commodities which have been supplemented are added by said controller to the information for the number of commodities retained at present in a respective vending machine and, when said information for said number of commodities retained at present in said respective vending machine exceeds said reference number information, an alarm is issued.

* * * * *